June 10, 1930.　　　　E. R. HOPKINS　　　1,762,297
GENERATOR CIRCUIT PROTECTOR
Filed July 18, 1927
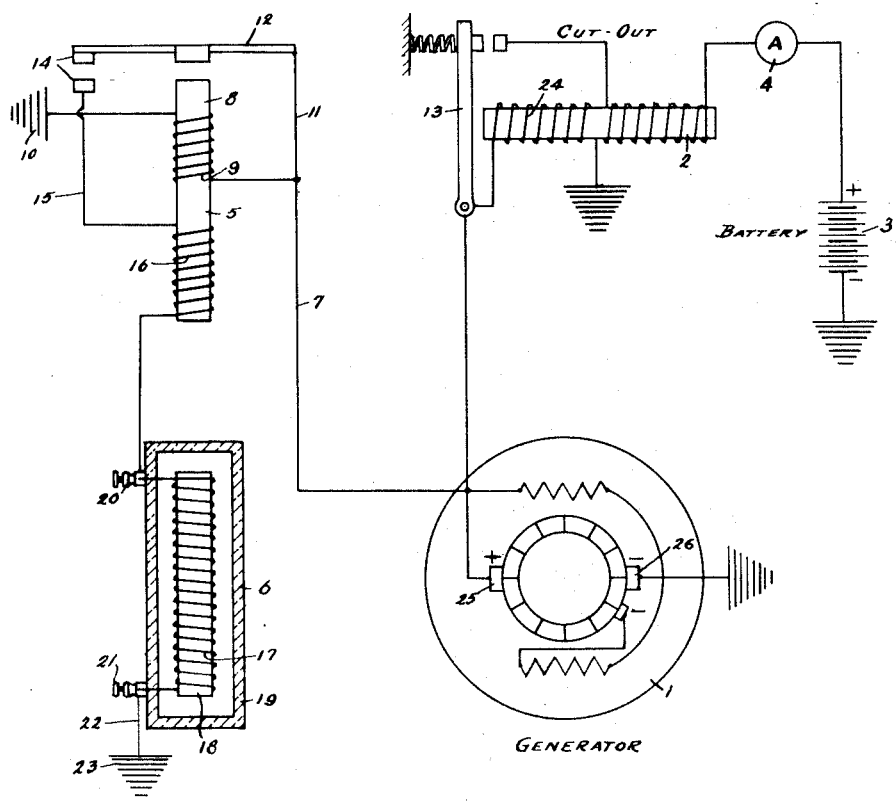
INVENTOR
Elton R. Hopkins
BY Munn & Co.
ATTORNEYS Patented June 10, 1930

1,762,297

UNITED STATES PATENT OFFICE

ELTON R. HOPKINS, OF SAN FRANCISCO, CALIFORNIA

GENERATOR CIRCUIT PROTECTOR

Application filed July 18, 1927. Serial No. 206,712.

My invention relates to improvements in generator circuit protectors, and it consists in the combinations, constructions, and arrangements hereinafter described and claimed.

An object of my invention is to provide a generator circuit protector which will automatically shunt the current from a generator to a resistance when the current from the generator is not being used for charging a battery, or when faulty connections exist between the generator and the battery.

A further object of my invention is to provide a device of the type described which is simple in construction, and which is automatic in operation.

Other objects and advantages will appear in the following specification, and the novel features of my invention will be particularly pointed out in the appended claims.

My invention is illustrated in the accompanying drawing forming a part of this application, in which the figure is a wiring diagram.

In carrying out my invention I make use of a generator indicated generally at 1, a cutout indicated at 2, a battery indicated at 3, and an armature indicated at 4. The drawing shows the parts 1 to 4, inclusive, as being electrically connected together in the usual manner.

No means has been heretofore provided for taking care of the current of a generator when this current was not being used for charging the battery, or for use in the ignition system or lighting system. It is obvious that if faulty connections exist between the battery 3 and the generator 1, the generator will become overheated, due to the fact that the E. M. F. will not be utilized and will therefore overheat the windings of the generator.

The automatic safety device consists of a double wound relay 5 and a resistance 6. A wire 7 is connected to the positive brush of the generator 1 and is wound around a core 8 of the relay 5, as at 9 and is then grounded at 10. A second wire 11 is tapped to the wire 7 and is connected to a switch arm 12. The arm 12 has a tension slightly greater than the switch arm 13 of the cutout 2, so that the arm 13 will close before the arm 12 will close. A contact 14 touches the switch arm 12, when the latter is moved by the magnetized core 8. A wire 15 leads from the contact 14 and is wound about the core 8 as at 16, and then passes to the resistance 6.

I have shown the resistance 6 as consisting of a wire 17, which is wrapped around a core 18, and which is mounted within a box 19, made of a non-conducting material. Terminals 20 and 21 are connected to the coil 17 and the terminal 20 has secured thereto the wire 16, while the terminal 21 has a wire 22 secured thereto, this wire being grounded at 23.

From the foregoing description of the various parts of the device, the operation thereof may be readily understood.

During the normal operation of the generator, cutout, and battery, the current will be fed from the generator through the cutout and into the battery. The cutout prevents the return flow of current to the generator when the generator ceases to operate.

My device functions when the current from the generator is not being used. The switch 12 is closed when the current flowing through the coil 9 reaches a predetermined point. The switch causes the current to flow through the coil 16, which keeps the switch closed and the current passes from the coil 16 through the resistance. This resistance takes the place of the battery 3 and prevents the generator from becoming overheated.

It will be noted that the smaller winding 9 is in parallel with the smaller winding 24 of the cutout 2. The wire 17 is wound upon a non-conductor of both heat and electricity, preferably around an iron core, as that indicated at 18. The resistance 6 is coupled in series with the larger relay winding 16 and forms a part of the circuit between the main brushes 25 and 26 of the generator 1.

The resistance wire 17 must be such that it will carry the regular generator charging rate (amperage and voltage such as delivering 14-20 amperes on a 6-8 voltage system, and 7-10 amperes on a 12-14 voltage system).

The resistance wires are used to take the place of the resistance offered by the battery and the circuit between the battery and the generator.

Although I have shown and described one embodiment of my invention, it is to be understood that the same is susceptible of various changes and I reserve the right to employ such changes as may come within the scope of the appended claims.

I claim:

1. A generator circuit protector comprising a generator; a battery and a cut-out relay disposed between the generator and battery and connected in series therewith; and a resistance circuit capable of taking the entire output of the generator and being connected to the generator and in parallel with the battery cut-out relay circuit; said resistance circuit including a double-wound relay for automatically throwing the entire output of the generator into the resistance circuit when the generator accidentally becomes disconnected from said battery circuit.

2. In a generator protector, a battery circuit including a generator, a battery and a cut-out relay connected in series with and between the generator and battery, in combination with an independent circuit connected to the generator and in parallel with the said battery circuit, said independent circuit comprising a double-wound relay for automatically throwing the entire output of the generator into the independent circuit when the generator accidentally becomes disconnected from said battery circuit, and a resistance in series with the holding winding of said double wound relay and said generator and capable of taking the entire output of the generator, the ohmic value of said resistance being substantially equal to that of the said battery.

ELTON R. HOPKINS.